United States Patent
Hurrell, II

[11] Patent Number: 5,491,893
[45] Date of Patent: Feb. 20, 1996

[54] ASSEMBLY METHOD FOR TWO ROW BALL BEARING WITH INTEGRAL, ANGULAR CONTACT PATHWAYS

[75] Inventor: George L. Hurrell, II, Port Clinton, Ohio

[73] Assignee: General Motors Corporation, Detroit, Mich.

[21] Appl. No.: 325,114

[22] Filed: Oct. 21, 1994

[51] Int. Cl.$^6$ ............................................. F16C 43/06
[52] U.S. Cl. .................. 29/898.061; 29/898.062; 29/898.064; 384/532; 384/544
[58] Field of Search .............. 29/898.061, 898.062, 29/898.064; 384/510, 531, 532, 544, 613, 614

[56] References Cited

U.S. PATENT DOCUMENTS

| | | | |
|---|---|---|---|
| 980,932 | 1/1911 | Eitner | 384/531 |
| 1,115,124 | 10/1914 | Starin | 29/898.061 X |
| 1,155,185 | 9/1915 | Winkler | 384/532 |
| 1,540,320 | 6/1925 | Cofrancesco et al. | 29/898.061 X |
| 4,069,435 | 1/1978 | Wannerskog et al. | 310/168 |
| 4,179,167 | 12/1979 | Lura et al. | 308/189 |

FOREIGN PATENT DOCUMENTS

| 48686 | 3/1921 | Sweden | 384/531 |
|---|---|---|---|

*Primary Examiner*—S. Thomas Hughes
*Attorney, Agent, or Firm*—Patrick M. Griffin

[57] ABSTRACT

A two row, integral pathway, angular contact ball bearing has a single separator to handle both ball rows, but without significant limitation on the total ball count and load capacity. The theoretical full complement ball count is determined, that is, the largest number of balls that could be installed in the first row. The largest even number equal to or smaller than the full complement count is then determined, and chosen for the total number of separator pockets. The separator pockets are formed by adjacent axial fingers, long enough to reach both ball rows, and joined by circumferentially alternating bights. Therefore, at each end of the separator, half the pockets are open, and half closed. When the first ball row is installed against one pathway of the inner race, there is no access limitation, and all pockets, open and closed, are filled. Then, the separator is shifted back to clear the other pathway, before the outer race is inserted over the inner race. Then, the two races are tilted off access far enough to allow the second ball row, which is half the first row, to be loaded in. After the races are tilted back to a coaxial orientation and the second ball row is evenly spaced out, the balls can be aligned with the open half of the pockets. This allows the separator to be pulled back from its shifted position, moving the remaining balls into the aligned open pockets.

2 Claims, 5 Drawing Sheets

5,491,893

ASSEMBLY METHOD FOR TWO ROW BALL BEARING WITH INTEGRAL, ANGULAR CONTACT PATHWAYS

This invention relates to bearing assembly methods in general, and specifically to a method for assembling a two row, angular contact ball bearing of the type that has fully integral ball pathways.

BACKGROUND OF THE INVENTION

Two row, angular contact ball bearings include a first race with axially inwardly facing ball pathways that engage the outside of the ball rows, and a second race with axially outwardly facing ball pathways that engage the inside of the ball rows. The most common type of two row ball bearing used as a vehicle wheel bearing puts the axially inwardly facing pathways on the inner race, so that the contact angles of the two ball rows converge and intersect on a plane midway between the ball rows. This provides a stiffer bearing than the alternative configuration, with divergent, non intersecting ball row contact angles. It is also most common in a vehicle wheel bearing to make one of the axially inwardly facing pathways separable or removable. This is done so that the second ball row can be loaded with the theoretical maximum number of balls as will fit between the pathways, a so called full complement. A good example of such a wheel bearing may be seen in co assigned U.S. Pat. No. 4,179,167 to Lura et al. Different bearing designs retain the separable pathway to the bearing in different ways, but the basic assembly method and reason for it are the same.

Another possible two row, angular contact ball bearing design has all four pathways fully integrally ground with the races. An example may be seen in U.S. Pat. No. 4,069,435 to Wannerskog et al. Integrally grinding all pathways eliminates the separable pathway and its retention structure, but limits load capacity, since the second installed ball row cannot be full complement. The first installed row can be, since it is installed before there is any access obstruction from the outer race. A smaller ball count in the second ball row is inevitable, however, because the only way to install it is to radially displace and tilt the races relative to one another, thereby widening the radial space between the races far enough to insert the balls. That installation space is only long enough to insert about half the number of balls. The balls are caged or separated within the two rows in two basic ways. Each ball row may be given its own, dedicated separator, as in the '435 patent. In that case, the first row has its separator installed first, and the second row last. The balls in the second row are spaced out evenly after loading, and a comb like cage with all open pockets is pushed axially in between the races and snapped over the balls. It is also known to align the balls in both rows in axially opposed pairs, and then install a single piece separator that has pockets long enough to reach and snap over both rows. This arrangement, of course, limits the first ball row count to the same number as the second row, which greatly limits load capacity.

SUMMARY OF THE INVENTION

The invention disclosed allows the use of a single separator to accommodate both ball rows of an integral pathway ball bearing without significantly limiting total ball count.

The one piece separator is molded in a sinuous shape, with ball pockets equal in number to the largest even number of balls that can theoretically be accommodated in the first ball row. Each pocket is comprised of a pair of axially extending fingers and each finger has an oppositely circumferentially extending bight at each end. The bights join the adjacent finger pairs so as to create generally U shaped pockets, half of which are open, and half closed, as viewed from either end.

When the first ball row is installed against one pathway of the inner race, each ball is placed in a separator pocket, which is then shifted out of position far enough to clear the remaining inner race pathway. Next, the outer race is moved over the inner race and tilted off axis far enough to open up a radial space for installation of the second ball row. The second row has a ball count that is exactly half of the first row. The outer race is then tilted back and the second ball row is spaced out evenly. Finally, the separator is shifted back so as to move each ball of the second row into those separator pockets that are open. The second row balls are blocked by the alternating bights from entry into the closed pockets. Since the first row ball count is close to the maximum possible, and since the second row ball count is generally only half of the first row in any integral pathway bearing, load capacity is close to the potential maximum.

DESCRIPTION OF THE PREFERRED EMBODIMENT

Figure 1A:
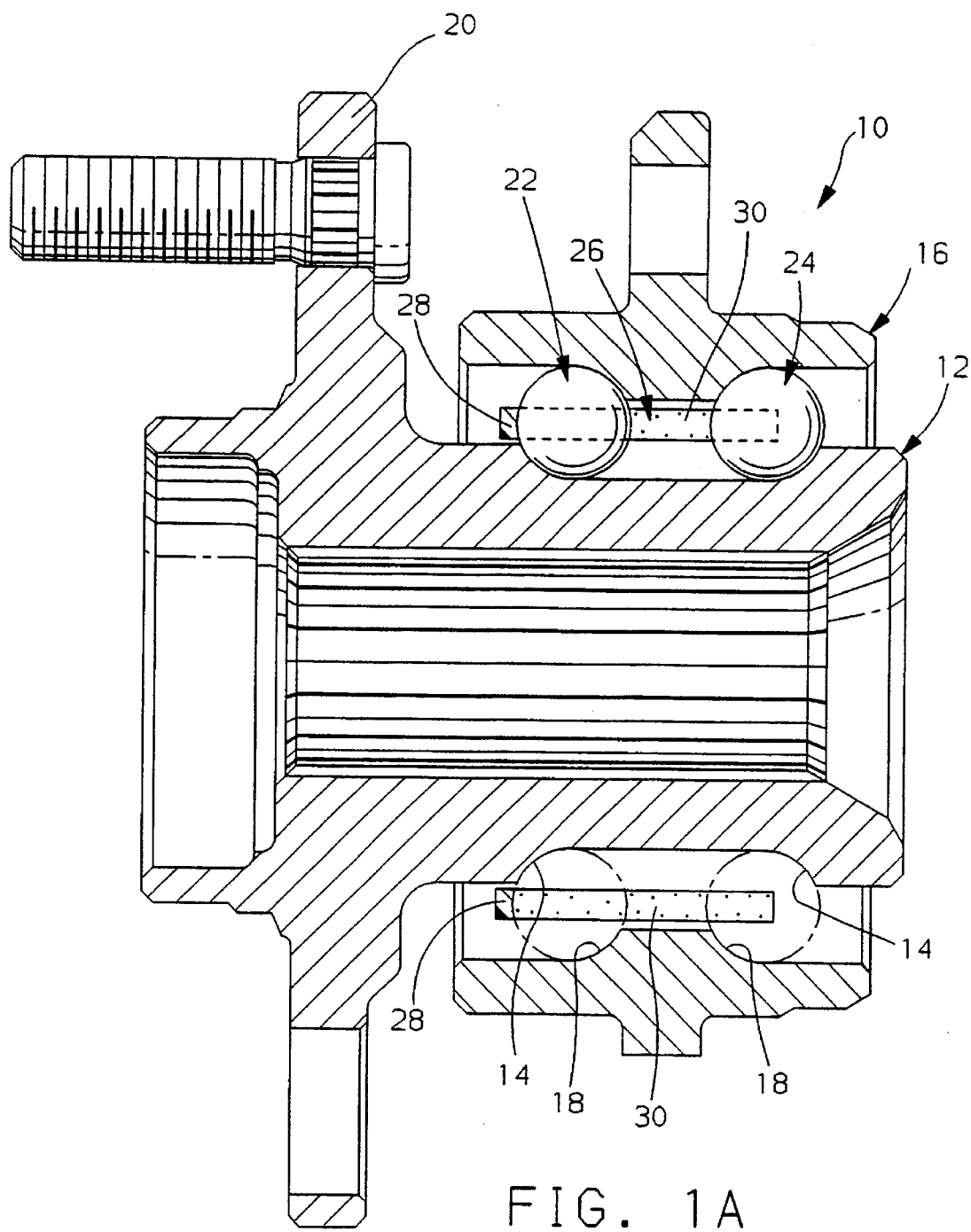
FIG. 1A is a cross section through a completed two row angular contact wheel bearing assembled according to the invention.
Figure 1B:
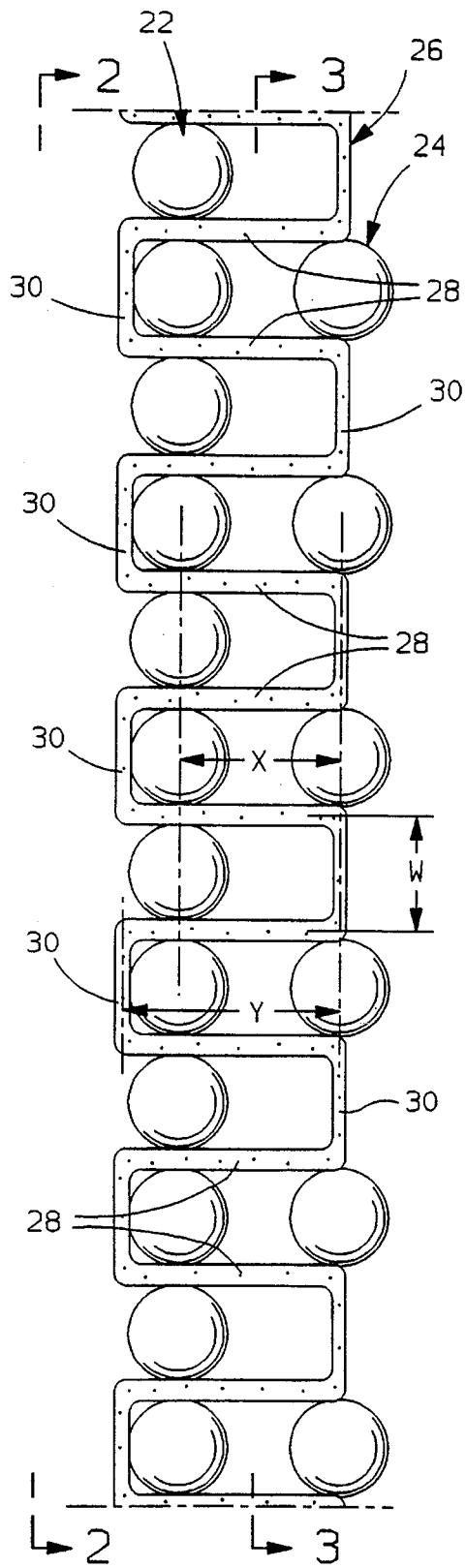
FIG. 1B is rolled out view of the separator and ball rows of the bearing.

Referring first to FIGS. 1A and 1B, a bearing assembled according to the invention, indicated generally at 10, is a two row, angular contact bearing with fully integral pathways of the convergent type. As such, the inner race 12 has a pair of axially inwardly facing pathways 14, while the outer race 16 has a pair of axially outwardly facing pathways 18 that form diagonally opposed pairs with the inner race pathways 14. In other bearing designs, a divergent configuration of the pathways might be chosen, in which case the inner race would have the axially outwardly facing pathways, and vice versa. Whichever race has the axially outwardly facing pathways will be the race that is assembled last. In vehicle wheel bearings, the inner race 12 is generally referred to as a spindle, and the outer race 16 as a hub. In the particular type of wheel bearing disclosed here, spindle 12 has a large diameter wheel flange 20, which necessitates that hub 16 be inserted over spindle 12 from right to left. Two rows of same size bearing balls, a first row 22 on the left and second row 24 on the right, run between the opposed pathway pairs 14 and 18, and would be enclosed by non illustrated bearing seals. The balls in the rows 22 and 24 each have the same pitch circle, and the center to center axial separation X between them, which is the same as the axial spread or "straddle" of the pathway pairs 14–18, is chosen to give sufficient stiffness to bearing 10. First row 22 is so designated because the necessity of installing hub 16 from right to left also requires that it be the ball row installed first. In other bearing designs, it might be possible to install the outer race from either direction, so that either ball row could be installed first. Therefore, it will be understood that all designations such as inner, outer, first, and second are arbitrary, and specific just to the bearing design disclosed here.

Figure 2:
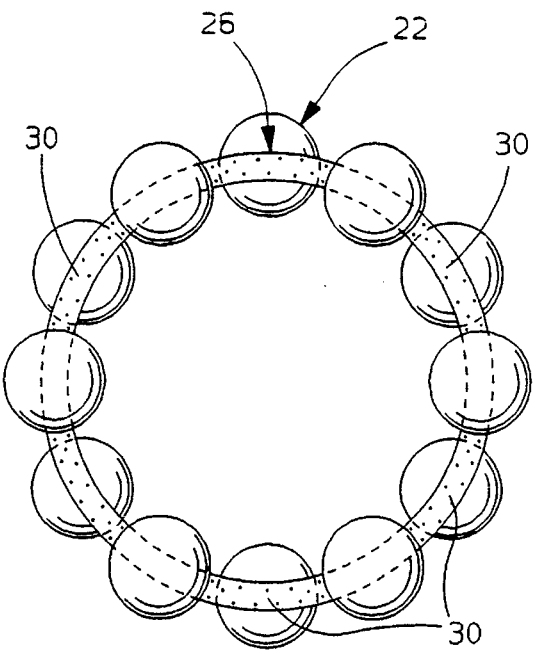
FIG. 2 is an end view of the separator and ball rows from the perspective of line 2—2 of FIG. 1B.
Figure 3:
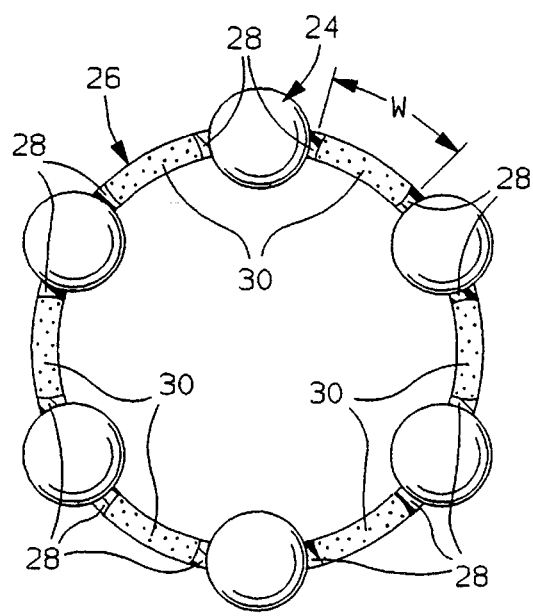
FIG. 3 is a cross section through the separator and ball rows taken along the line 3—3 of FIG. 1B.

Referring next to FIGS. 1B through 3, bearing 10 uses a single cage or separator, designated generally at 26. Separator 26 is molded in one piece from a suitable plastic in a sinuous shape, with twelve total pockets. In the disclosed embodiment, twelve is the largest even number that is less than, or equal to, the theoretical full maximum number of balls that would fit between the pathways 14–18. In other words, the full complement number would be less than fourteen, but more than twelve. Of course, if the full complement maximum were thirteen and a fraction, only thirteen balls could practically fit, so the cage pocket number, at worst, will be one fewer than the number of balls that could actually be used. Each pocket is comprised of a pair of axially extending fingers 28 joined by a circumferentially extending bight 30. Each pocket shares a finger 28 with the adjacent pocket, and the bights 30 extend in opposite circumferential directions from the ends of each finger 28, thereby alternating around the axial ends of the separator 26. Consequently, as FIGS. 2 and 3 show, every other adjacent pair of fingers 28 is open (or closed), as viewed from either end. Such a configuration also allows a separator like 26 to be molded by the axial draw technique, using only two molds that part along a single axis. The end to end length Y of separator 26, which is essentially the same as the length of the fingers 28, is comparable to X, and preferably a bit longer. This allows the fingers 28 to reach and adequately separate both ball rows 22 and 24. Each adjacent pair of fingers 28 has a circumferential width W substantially equal to a ball diameter, and the side surfaces thereof have a matching curvature that "snaps" around the balls 22 and 24. FIGS. 2 and 3 are not intended to indicate, however, that the balls in rows 22 and 24 could or would be held tightly enough in separator 26 to constitute a separately handled unit or subassembly. Such a subassembly would not be useful here, since it could not be installed as a unit, as will appear below.

Figure 4:
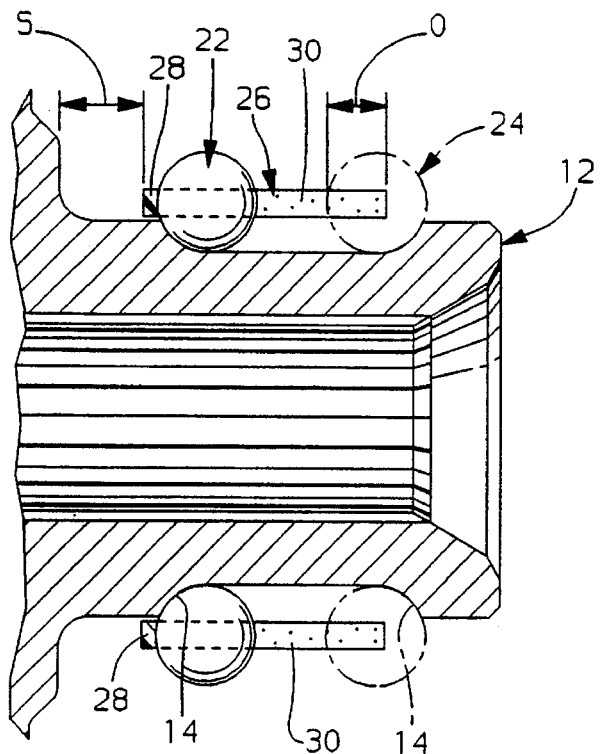
FIG. 4 shows the first ball row installed and separated.
Figure 5:
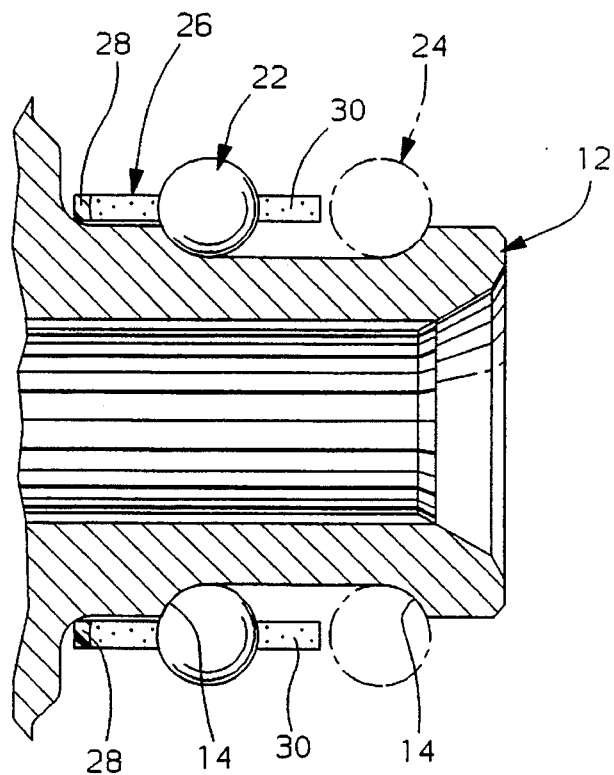
FIG. 5 shows the separator shifted back.
Figure 6A:
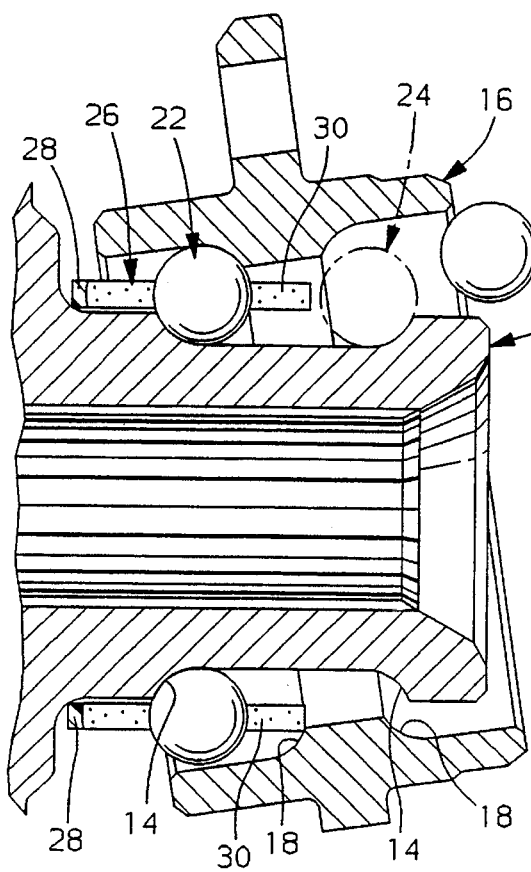
FIG. 6A shows the outer race moved over the inner race and tilted off axis so as to admit the second ball row.
Figure 6B:
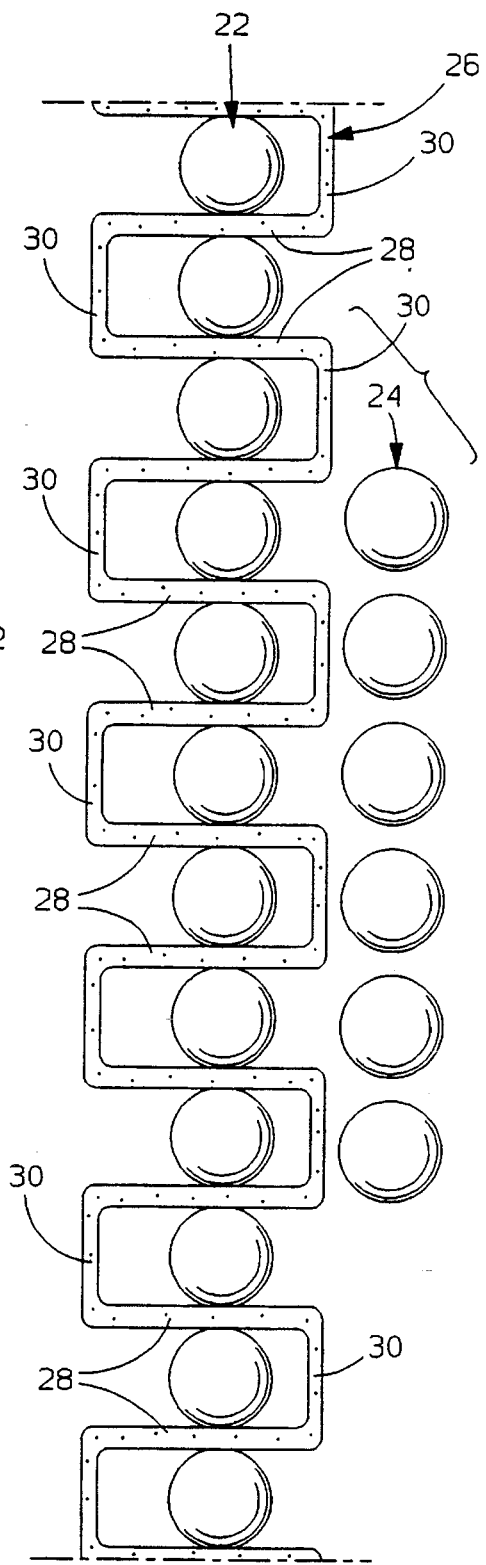
FIG. 6B is a rolled out view of the separator and ball rows at the assembly stage corresponding to FIG. 6A.

Referring next to FIGS. 4 and 5, the first steps in the assembly process are illustrated. The first ball row 22 is placed against the accessible pathway of whichever race has the axially inwardly facing pathways, which, here, is the left pathway 14 of the spindle 12. At the same time, each of the twelve balls of the first row 22 is placed between a pair of fingers 28 of separator 26, filling both the "open" and the "closed" pockets. This may be done by first placing separator 26 over the left pathway 14 as shown, and then snapping the first row balls 22 in, or by snapping the balls 22 into separator 26 first, and then moving it into place. The end result is the same, and there is no difficulty in installing first row 22 in either fashion, since hub 16 has not yet been inserted over spindle 12. Next, as shown in FIG. 5, separator 26 is shifted to the left far enough to pull it clear of the other spindle pathway 14, that is, clear of the eventual position of the second ball row 24, shown in dotted line. Separator 26 could be moved to the FIG. 5 position even before the balls of first row 22 were installed, if desired. "Shift" does not imply a time order, merely a temporary axial position different from the ultimate, installed position. To allow this shift, the distance S between the installed left end position of separator 26 and wheel flange 20, shown in FIG. 4, should be somewhat greater than the distance O by which the installed right end position of separator 26 overlaps the second ball row 24. Furthermore, the distance O should be at least equal to the radius of the balls of the second row 24, for good ball control. This represents one limitation on the axial length of separator 26, that is, it cannot be so long as to be incapable of shifting far enough toward flange 20 to clear the other pathway 14. Furthermore, separator 26 should not be so long as to protrude past hub 16 when installed, so as not to interfere with seal installation.

Figure 7A:
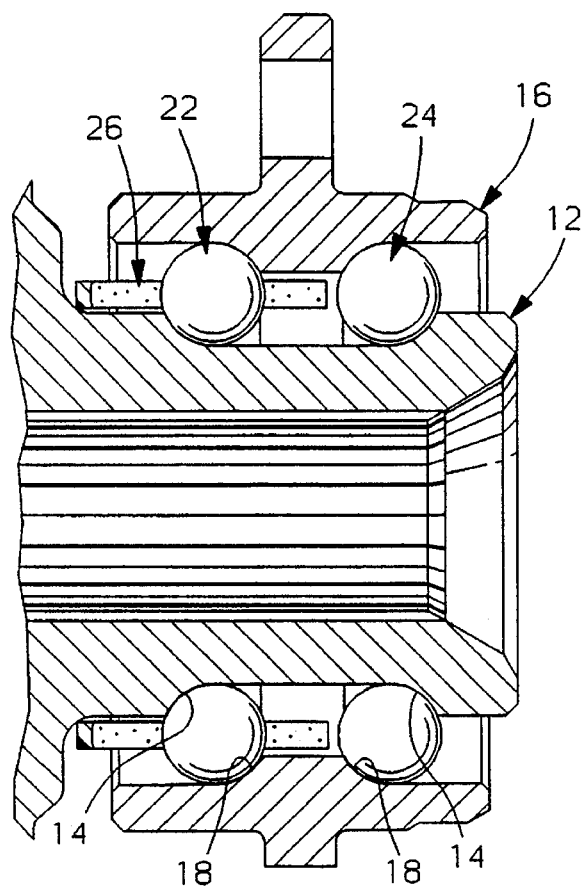
FIG. 7A shows the second ball row spaced out and the outer race moved back coaxial to the inner race.
Figure 7B:
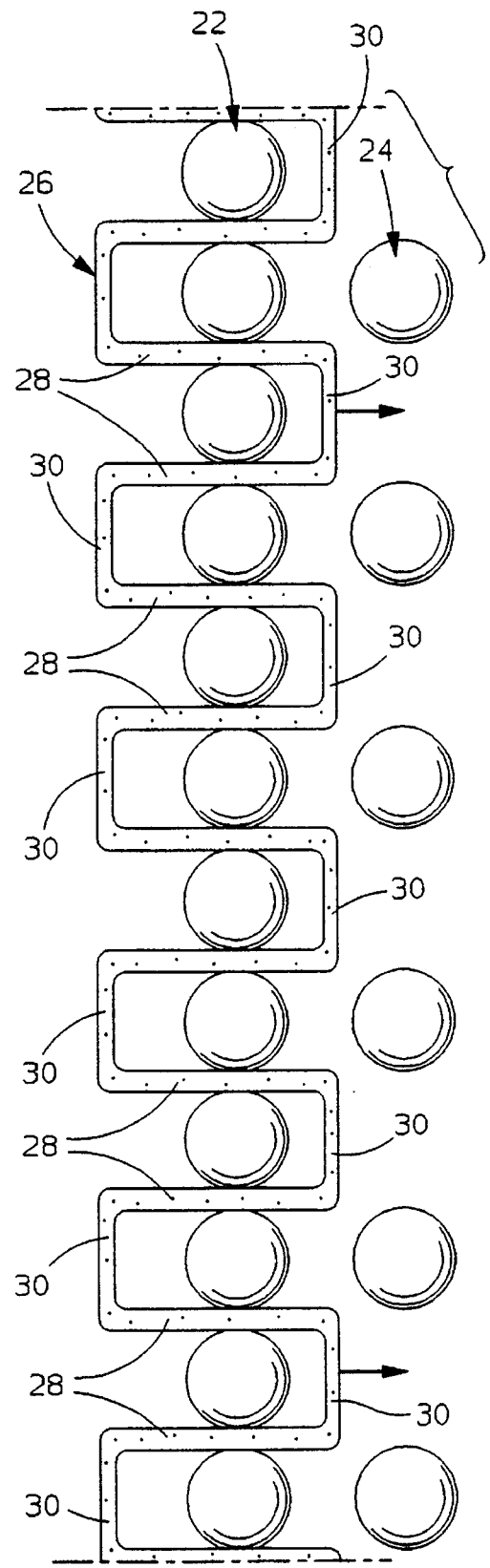
FIG. 7B is a rolled out view of the separator and ball rows at the assembly stage corresponding to FIG. 7A.

Referring next to FIGS. 6A through 7B, hub 16 is moved axially over spindle 12, toward wheel flange 20, until its left pathway 18 hits the first installed ball row 22, which registers the pathways 14 and 18 in diagonally opposed pairs. Then, hub 16 is tilted off axis, which widens one half of the radial space between it and spindle 12, and narrows the other half. Hub 16 could be tilted in any direction desired, but is shown as being tilted upward here. The upper, widened part of the radial space is wider than the diameter of a ball from second row 24, wide enough that the balls from second row 24 can be loaded between the remaining opposed pathways 14 and 18. The widened portion of the radial space is only long enough to admit half the number of balls of the first row 22, however. The hub 16 is then tilted back coaxial to spindle 12, which allows the balls from row 24 to be spaced out evenly, as shown in FIG. 7A. The balls of second row 24 are then spaced out evenly, as shown in FIG. 7B, and arrayed so as to align each ball with an open pocket of the right end of separator 26. Then, separator 26 is shifted back to the right, as by pulling on the bights 30 in the direction of the arrows, which pushes each ball of second row 24 between a pair of "open" fingers 28. The balls of second row 24 need not be perfectly aligned with the open pairs of fingers 28, since the bights 30 will block them from entering the closed pockets. Blockage would prevent the separator 26 from being pulled all the way back, and serve as a signal to the operator to move any misaligned balls of second row 24 to the proper position.

Referring again to FIGS. 1A and B, the completed bearing 10 has both ball rows 22 and 24 handled by a single separator 26. The only limitation on the load capacity of bearing 10, as opposed to a conventional integral pathway bearing assembled with two dedicated separators, is that the first row 22 may be one ball short of a theoretical full complement, as noted above. However, the second row will generally hold only half the number of the first row in any case, so the two-to-one ball ratio of row 22 to row 24 does not represent a significant limitation on total load capacity. Theoretically, second row 24 could number a smaller, even integer fraction of the first row of the first row 22. Here, that would translate to a possible ball count in row 24 of three (one fourth of twelve). As a practical matter, however, that would seldom be done, because of the severe limitation on load capacity that would entail. Also, a "short" second row 24 would have to be more carefully aligned with the open pockets at the right end of separator 26, since not every open pocket could be filled. A "full" second row 24 is easier to install, since the bights 30 make it impossible to insert the balls anywhere but between the open pairs of fingers 28. If desired, the bights 30 could be molded with a slight V shape or curvature so as to wedge between and guide the balls of the second row 24 toward the open pairs of fingers 28.

Therefore, it will be understood that it is not intended to limit the invention to just the embodiment disclosed.

The embodiments of the invention in which an exclusive property or privilege are claimed are defined as follows:

1. A method of assembling a two row, angular contact ball bearing of the type having first and second coaxial races, said first race having a pair of axially inwardly facing, integral pathways and said second race having a pair of axially outwardly facing, integral pathways registered in diagonally opposed pairs with and radially spaced from said first race pathways with two axially spaced ball rows engaged therebetween, comprising the steps of, provinding a one piece ball separator with a sinuous shape having an even number of interconnected ball pockets, each pocket comprising a pair of axially extending fingers with an axial length substantially equal to the axial spacing of said ball rows and circumferentially spaced apart by substantially a ball diameter, each pair of fingers being joined by circumferentially extending, alternating bights at opposite ends of said fingers so that half of said pockets are open, and half closed, at each end of said separator, engaging one ball row with one pathway of said first race, inserting the balls of said one ball row within all of the pockets of said separator, shifting said separator axially so as to move said separator clear of the other pathway of said first race, moving said second race axially over said first race far enough to engage one of its pathways with said one ball row and register the pathways of said races in said diagonally opposed pairs while relatively tilting said races far enough to widen a portion of the radial space therebetween greater than a ball diameter, inserting the balls of said second row through said widened radial space and between the other pathways of said races, said balls being half the number of said first row, moving said races to a coaxial orientation, circumferentially spacing the balls of said second row between said other pathways so as to align with the open pockets of said separator, and, shifting said separator in the opposite axial direction far enough to move the balls of said second ball row into said open pockets.

2. A method of assembling a two row, angular contact ball bearing of the type having first and second coaxial races, said first race having a pair of axially inwardly facing, integral pathways and said second race having a pair of axially outwardly facing, integral pathways registered in diagonally opposed pairs with and radially spaced from said first race pathways with two axially spaced ball rows engaged therebetween, comprising the steps of, determining the full complement number of predetermined diameter balls that will fit between said opposed pathway pairs, providing a one piece ball separator with a sinuous shape having a number of interconnected ball pockets equal to the largest even number that is less than or equal to said full complement number, each pocket comprising a pair of axially extending fingers with an axial length substantially equal to the axial spacing of said ball rows and spaced circumferentially apart by substantially a ball diameter, each pair of fingers being joined by circumferentially extending, alternating bights at opposite ends of said fingers so that half of said pockets are open, and half closed, at each of said separator, engaging one pathway of said first race with a first row of balls equal to said largest even number, inserting the balls of said first row within all of the pockets of said separator, shifting said separator axially so as to move said separator clear of the other pathway of said first race, moving said second race axially over said first race far enough to engage one of its pathways with said one ball row and register the pathways of said races in said diagonally opposed pairs while relatively tilting said races far enough to widen a portion of the radial space therebetween greater than a ball diameter, inserting a second row of balls equal to half of said largest even number through said widened radial space and between the other pathways of said races, moving said races to a coaxial orientation, circumferentially spacing the balls of said second row between said other pathways so as to align with the open pockets of said separator, and, shifting said separator in the opposite axial direction far enough to move the balls of said second ball row into said open pockets.

* * * * *